United States Patent [19]
Fukuda et al.

[11] Patent Number: 5,159,666
[45] Date of Patent: Oct. 27, 1992

[54] APPARATUS AND A METHOD FOR ENLARGING DOT MATRIX DATA

[75] Inventors: Kunio Fukuda, Mizuho; Michio Osada, Hamura; Masaki Kobayashi, Akishima, all of Japan

[73] Assignees: Casio Computer Co., Ltd.; Casio Electronics Manufacturing Co., Ltd., both of Tokyo, Japan

[21] Appl. No.: 558,623

[22] Filed: Jul. 27, 1990

[30] Foreign Application Priority Data

Jul. 31, 1989 [JP] Japan ................................. 1-196871

[51] Int. Cl.⁵ .............................................. G06F 3/14
[52] U.S. Cl. .................................... 395/139; 395/133; 340/723; 340/731; 382/46
[58] Field of Search ..................... 364/518, 521, 522; 382/47, 46, 56; 340/747, 750, 798, 799, 723, 731; 395/139, 133, 128

[56] References Cited

U.S. PATENT DOCUMENTS

| | | | |
|---|---|---|---|
| 4,532,605 | 7/1985 | Waller | 364/900 |
| 4,639,857 | 1/1987 | McCanny et al. | 364/200 |
| 4,979,229 | 12/1990 | Moolenaar | 382/56 |
| 5,007,001 | 4/1991 | Lloyd-Williams | 364/518 |

FOREIGN PATENT DOCUMENTS

| | | |
|---|---|---|
| 51-92125 | 8/1976 | Japan . |
| 62-7559 | 1/1987 | Japan . |
| 62-23316 | 5/1987 | Japan . |
| 63-274989 | 11/1988 | Japan . |

*Primary Examiner*—Gary V. Harkcom
*Assistant Examiner*—Phu K. Nguyen
*Attorney, Agent, or Firm*—Nixon & Vanderhye

[57] ABSTRACT

In enlarging dot matrix data stored in an original memory on a work memory, it is discriminated whether or not a data write position overlaps the position of already-produced data. If no overlapping occurs, the data is written as it is in the work memory. If overlapping occurs, it is then discriminated whether or not the color of a dot in the original memory to be processed is the same as that of a dot adjacent to the target dot. If the colors are the same, data is written at positions except the overlapped portion. In other words, data already written at the overlapped position is given a priority. On the other hand, if the dots are of different colors, data at the overlapped portion is temporarily cleared and data is written at positions including the overlapped portion.

20 Claims, 9 Drawing Sheets

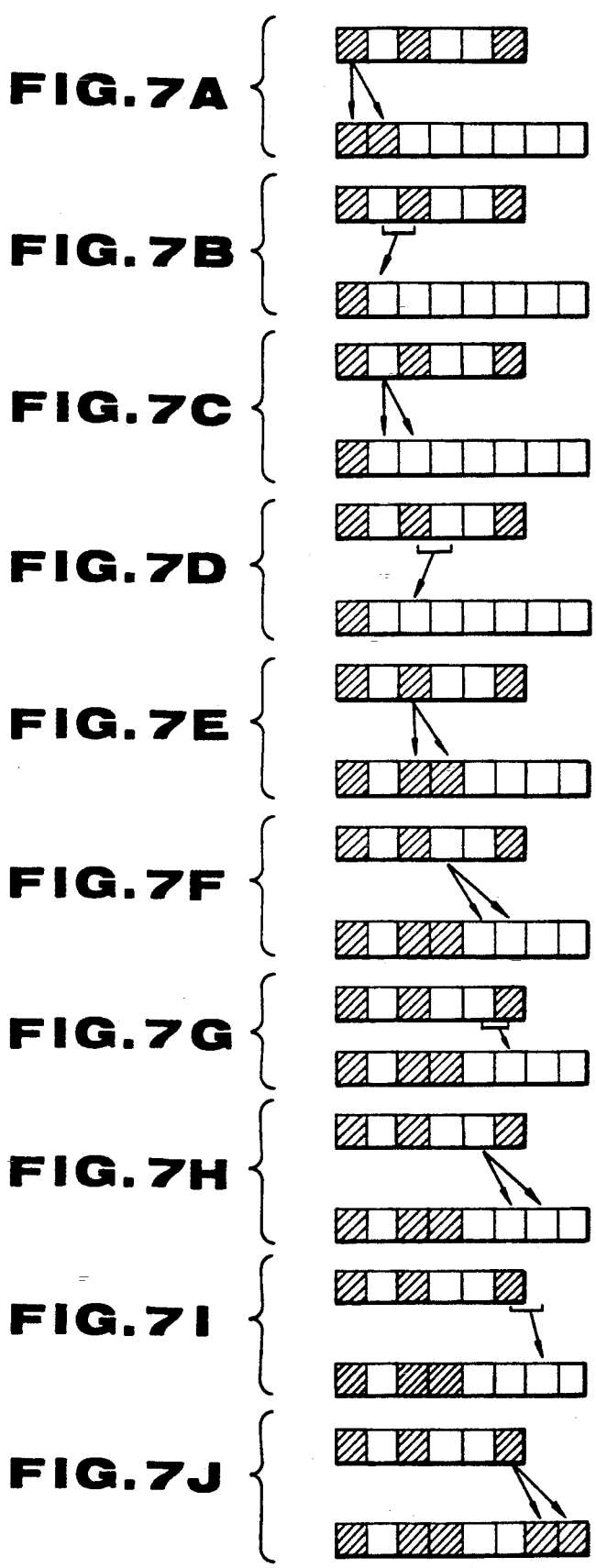

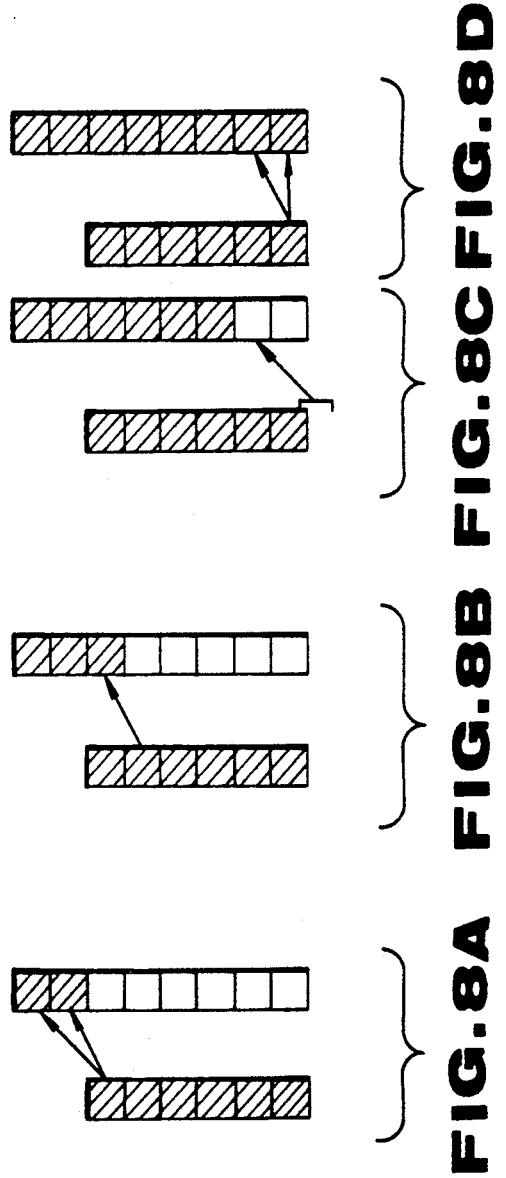

APPARATUS AND A METHOD FOR ENLARGING DOT MATRIX DATA

BACKGROUND OF THE INVENTION

1. Field of the Invention

The present invention relates to an apparatus and a method for enlarging dot matrix data.

2. Description of the Related Art

There is a case in which dot matrix data output for a printer of a low printing density is supplied to a printer of a high printing density. In this case, keeping an image to be printed to the desired size requires the printer to enlarge the received dot matrix data, i.e., to enlarge the size of dot matrix pattern data; the expression hereinafter is used in this sense. Assume now that dot matrix data output for an impact printer having a printing density of 180 DPI (dots per inch) is supplied to a liquid crystal printer with a printing density of 240 DPI. To maintain the size of the image to be printed to the original value, the liquid crystal printer should magnify the dot matrix data by 4/3 in both row and column directions.

There are two known methods for enlarging dot matrix data:

(1) To enlarge a specific bit of dot matrix data by a predetermined number. A specific example of this method is illustrated in FIG. 1A. In the illustrated example, the third bit of 3-bit dot matrix data is arranged at the third and fourth bits of enlarged 4-bit data.

(2) To enlarge the data size by acquiring a logical sum of adjoining bits of dot matrix data and using it as bit data of new dot matrix data. A specific example of this method is shown in FIG. 2A. In the illustrated example, a logical sum of bit data of the first and second bits of 3-bit dot matrix data serves as bit data of the second bit of new dot matrix data, and a logical sum of bit data of the second and third bits of the original dot matrix data likewise serves as bit data of the third bit of the new dot matrix data.

The above two methods cannot enlarge dot matrix data with high fidelity.

For instance, if 3×3 dot matrix data shown on the left side in FIG. 1B is magnified by 4/3 using the first method shown in FIG. 1A, dot matrix data after enlargement would be as illustrated on the right side in FIG. 1B. If 3-bit data shown in the upper half in FIG. 2B is magnified by 4/3 using the second method shown in FIG. 2A, enlarged dot matrix data would be as illustrated in the bottom half in FIG. 2B.

As should be obvious from the above, the prior art methods, when used to enlarge dot matrix data, degrade the quality of a printed image.

SUMMARY OF THE INVENTION

Accordingly, it is an object of the present invention to provide an apparatus and a method of enlarging dot matrix data with a relatively high fidelity.

To achieve this object, according to one aspect of the present invention, there is provided an apparatus of enlarging dot matrix data, which comprises:

original memory means for storing dot matrix data to be enlarged;

work memory means for storing dot matrix data in an enlargement process;

magnification designating means for specifying a magnification;

read means for reading data from the original memory means dot by dot;

position designating means for specifying write positions to write data read out from the original memory means into the work memory means in response to the magnification specified by the magnification designating means; and write means for writing data read out from the read means in the work memory means at the positions specified by the position designating means;

the position designating means including, computation means, in response to the magnification, for computing positions in the work memory means into which the data read by said read means are to be written, discrimination means for discriminating whether or not the positions computed by the computation means overlap a position in the work memory means where data is already written, means for making the positions computed by the computation means as an output of the position designating means when the discrimination means discriminates that no overlapping has occurred, comparing means for comparing the data read out by the read means with data adjoining the read-out data in an enlarging direction and to be read out later when the discrimination means discriminates that overlapping has occurred, means for substantially clearing data stored in the work memory means at the positions computed by the computation means and making the computed positions as an output of the position designating means, when the comparing means determines that the compared data differ from each other, and means for making at least one of the positions computed by the computation means which is other than those discriminated by the discrimination means to show overlapping as an output of the position designating means, when the comparing means determines that the compared data coincide with each other.

According to another aspect of the present invention, there is provided a method of enlarging dot matrix data, which comprises:

a read step of reading original dot matrix data dot by dot;

a computation step of computing write position to write the dot matrix data read out in the read step, in response to a magnification;

a discrimination step of discriminating whether or not the positions computed in the computation step overlap a position where data is already written;

a step of writing the data read out in the read step at the positions computed in the computation step when it is discriminated in the discrimination step that no overlapping has occurred;

a comparison step for comparing the data read out in the read step with data adjoining the read-out data in an enlarging direction and to be read out later when it is discriminated in the discrimination step that overlapping has occurred;

a step of substantially clearing data stored at the positions computed in the computation step and writing the data read out in the read step at the computed positions, when it is determined in the comparison step that the compared data differ from each other; and a step of writing the data read out in the read step at those of the positions computed in the computation step which are other than those discriminated in the discrimination step to overlap each other, when it is determined in the comparison step that the compared data coincide with each other.

With the above arrangement and steps, according to the apparatus and method of the present invention, in enlarging dot data, (1) it is discriminated whether or not data write positions overlap the position of data which has already been produced, (2) data is written as it is when no overlapping has occurred, and (3) it is discriminated whether or not adjoining dots are of the same color when overlapping has occurred. If the dots are of the same color, the dots of the same color will be written at the next writing time, so that read-out data is written at positions except the overlapped portion. In other words, data already written at the overlapped position is given a priority. On the other hand, if the dots are of different colors, in order to protect data presently read out, the overlapped portion is temporarily cleared and the read-out data is written at positions including the overlapped portion. With the use of this technique, assuming that presently-read data is white data and data at the overlapped portion is of black, white data is written at the overlapped portion when adjoining data is black data, thus preventing white data from being smeared with black data. It is therefore possible to acquire enlarged dot matrix data which has a good contrast and has a relatively high fidelity to original data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 7A-7J and 8A-8D are diagrams for explaining a data enlarging operation.

DETAILED DESCRIPTION OF THE PREFERRED EMBODIMENT

A preferred embodiment of the present invention will now be described referring to the accompanying drawings.

Figure 1A:
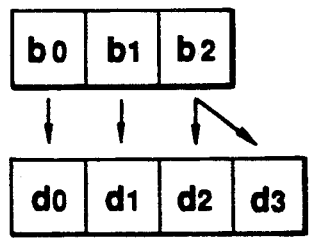
FIGS. 1A, 1B, 2A and 2B are diagrams for explaining related art methods of enlarging dot matrix data.
Figure 1B:
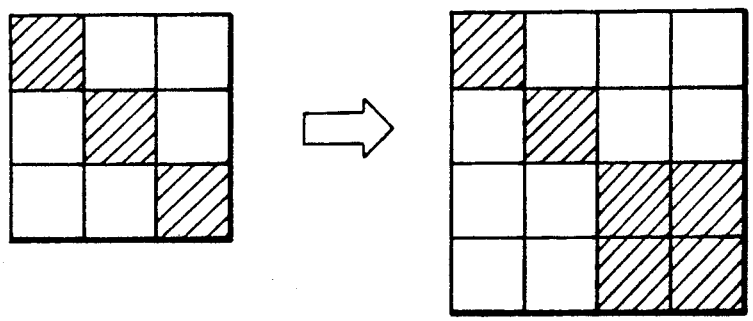
Figure 2A:
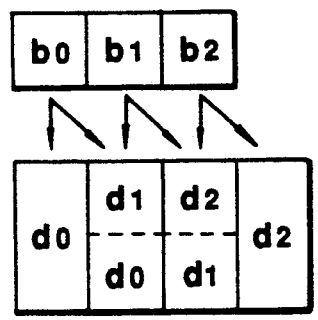
Figure 2B:
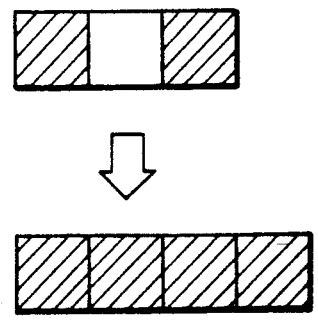
Figure 3:
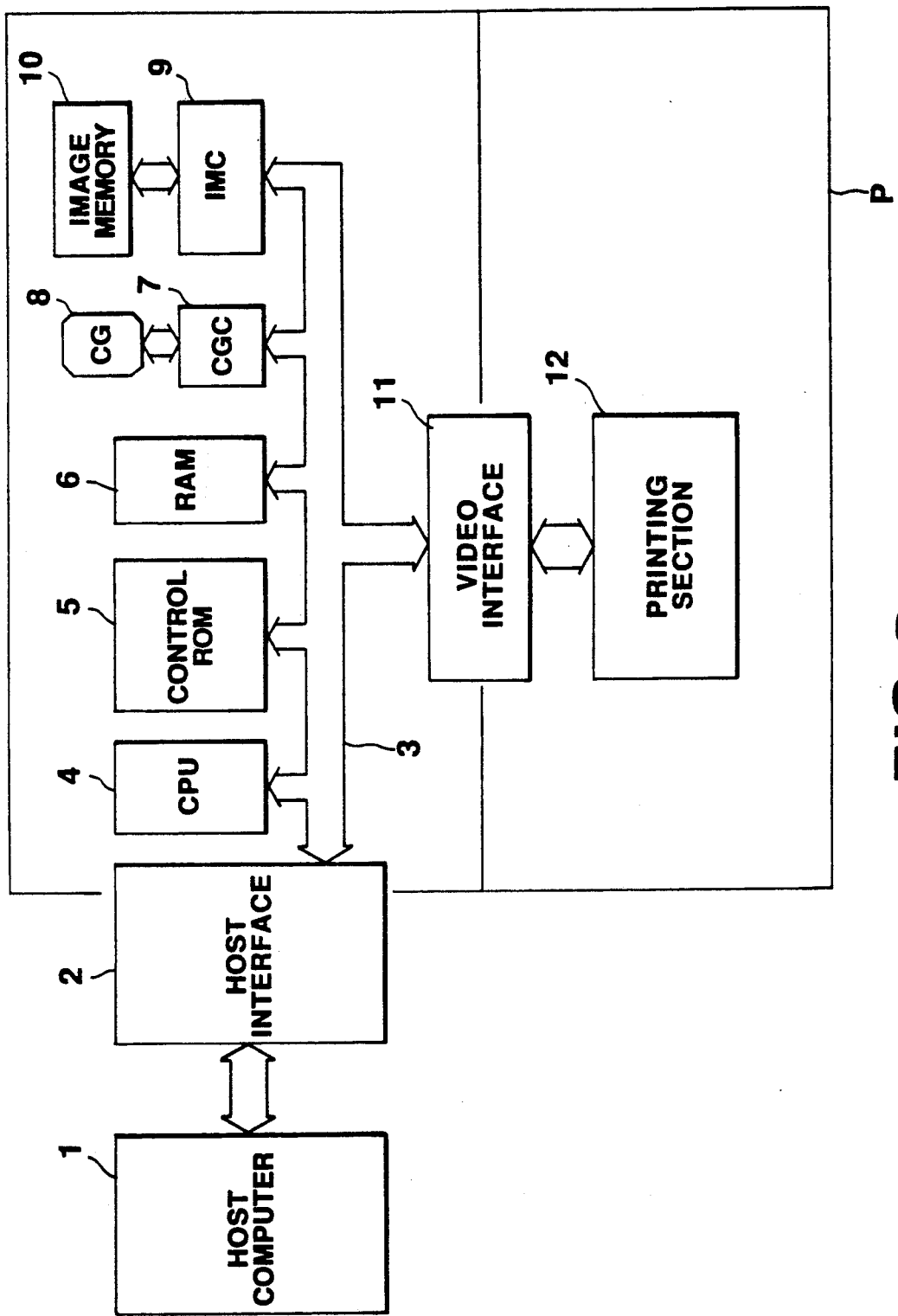
FIG. 3 is a block diagram illustrating the arrangement of a printer apparatus according to one preferred embodiment of the present invention.

FIG. 3 shows the circuit structure of a printer P according to this embodiment, which has a function for enlarging dot matrix data.

Print data, supplied from a host computer 1, is sent through a host interface 2 to a bus 3 in the printer P. The print data includes character code data and dot matrix data for defining an image, such as a character or a figure.

The bus 3 is connected to a CPU (Central Processing Unit) 4, a control ROM 5, a RAM 6, a CGC (Character Generator Controller) 7, an IMC (Image Memory Controller) 9, and a video interface 11. The CGC 7 is connected to a CG (Character Generator) 8, and the IMC 9 to an image memory 10. The video interface 11 is connected to a printing section 12.

The CPU 4 executes the general control of the printer. According to a control program stored in the control ROM 5, the CPU 4 performs the following operations:

(1) An operation for storing the print data from the host computer 1 in the RAM 6.

(2) An operation for reading character font data corresponding to a character code if the print data includes the character code.

(3) An operation for transmitting enlarged dot matrix data to the video interface 11.

Figure 4:
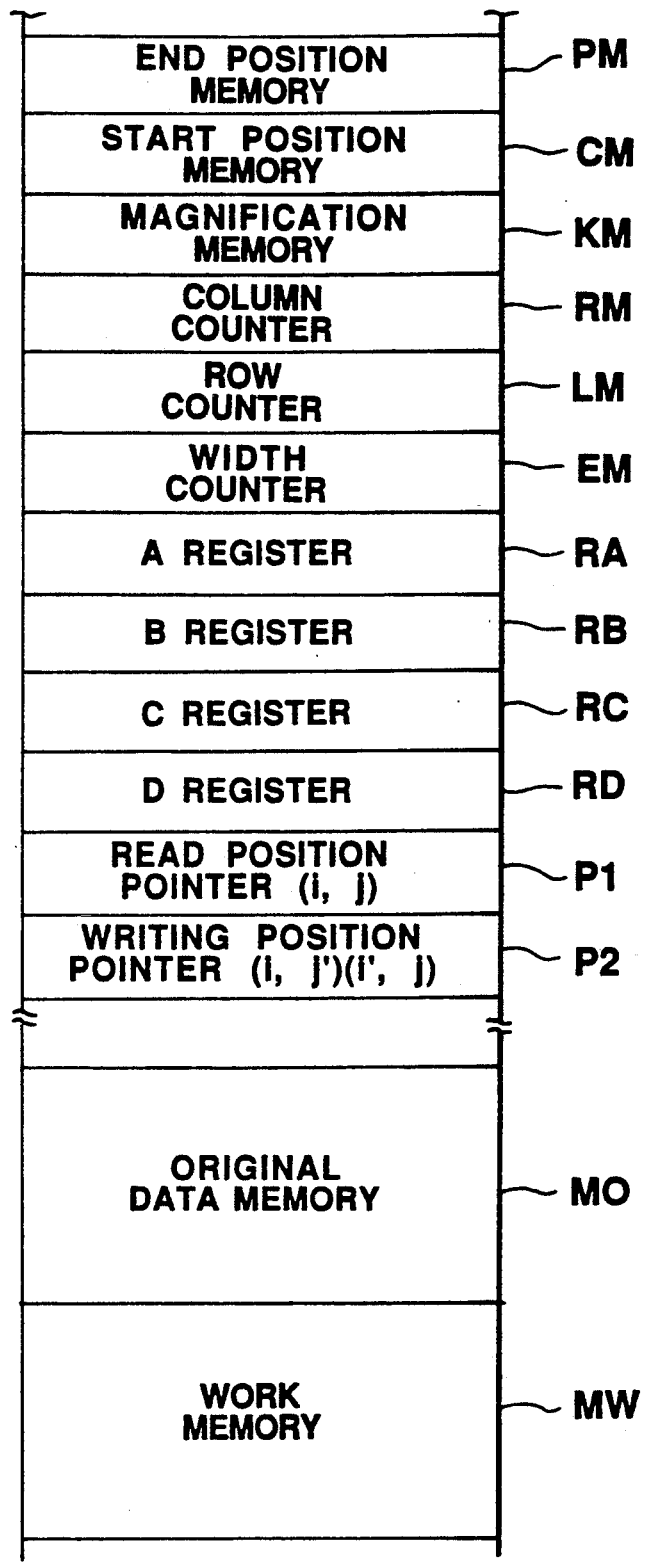
FIG. 4 is a block diagram illustrating the configuration of a RAM shown in FIG. 3.

The RAM 6, which is used for enlargement of dot matrix data, includes an end position memory PM, a start position memory CM, a magnification memory KM, a column counter RM, a row counter LM, a width counter EM, A to D registers RA to RD, a read position pointer P1, a write position pointer P2, an original data memory MO, and a work memory MW, as shown in FIG. 4.

In enlarging dot matrix data in a column direction, the end position memory PM stores the last column number of data which has been written in the work memory MW by the previous writing operations. In enlarging dot matrix data in a row direction, the memory PM likewise stores the last row number of the data written in the work memory MW by the previous writing operation.

The start position memory CM comprises an integer portion storing area and a decimal portion storing area. The integer portion storing area stores the number of the first column of a memory area in the work memory MW where data is to be written by the present writing operation at the time of data enlargement in the column direction. In enlarging dot matrix data in the row direction, the integer portion storing area of the memory CM stores the number of the first row of a memory area in the work memory MW at which data is to be written by the present writing operation.

The magnification memory KM stores a magnification K for magnifying dot matrix data.

The column counter RM counts the number of the remaining columns in a process of enlarging dot matrix data.

The row counter LM counts the number of the remaining rows in the process of enlarging dot matrix data.

The width counter EM indicates to what bits dot matrix data should be enlarged before it is written in the work memory MW.

The A to D registers RA-RD are used to determine whether or not two adjacent pieces of dot data are identical to each other in a process of enlarging dot matrix data.

The read position pointer P1 stores coordinates (i, j) of a position in the original data memory MO from which data is read out.

The write position pointer P2 specifies the coordinates of a position in the work memory MW in which dot data is to be written. In other words, the pointer P2 stores coordinates (i, j') when the data is enlarged in the column direction, and stores coordinates (i', j) when the data is enlarged in the row direction.

The original data memory MO stores dot matrix data to be enlarged.

The work memory MW serves to store enlarged dot matrix data and dot matrix data in the enlarging process.

The host computer 1 sends information of characters or an image directly in the form of dot matrix data to the printer P, or sends information of characters and symbols as character codes to the printer P. The CG 8 generates dot matrix data corresponding to a character code.

The CGC 7 reads character font data, corresponding to a character code supplied from the CPU 4, from the CG 8 and sends the data through the bus 3 to the RAM 6.

The IMC 9 stores enlarged dot matrix data from the RAM 6 into the image memory 10. Further, the IMC 9 reads data from the image memory 10, and sends it to the video interface 11 line by line.

The printing section 12 includes a liquid crystal shutter, a photosensitive drum and a developer, for example. Upon reception of dot matrix data for each line from the interface 11, the printing section 12 optically writes the data on the photosensitive drum, and prints it on a sheet of paper through an electrophotographic process.

Referring now to FIGS. 5A, 5B, 6A to 6C, 7A to 7J, and 8A to 8C, a description will be given of the operation of the printer P in the case of enlarging dot matrix data which is sent directly from the host computer 1, or is supplied from the CGC 8 in association with a character code.

A specific enlargement operation will be described with reference to the case of enlarging 6×6 dot matrix data (see FIG. 6A) 4/3 times in both row and column directions.

In this embodiment, the dot matrix data is enlarged in a column direction, then in a row direction, to have an 8×8 size.

Figure 5A:
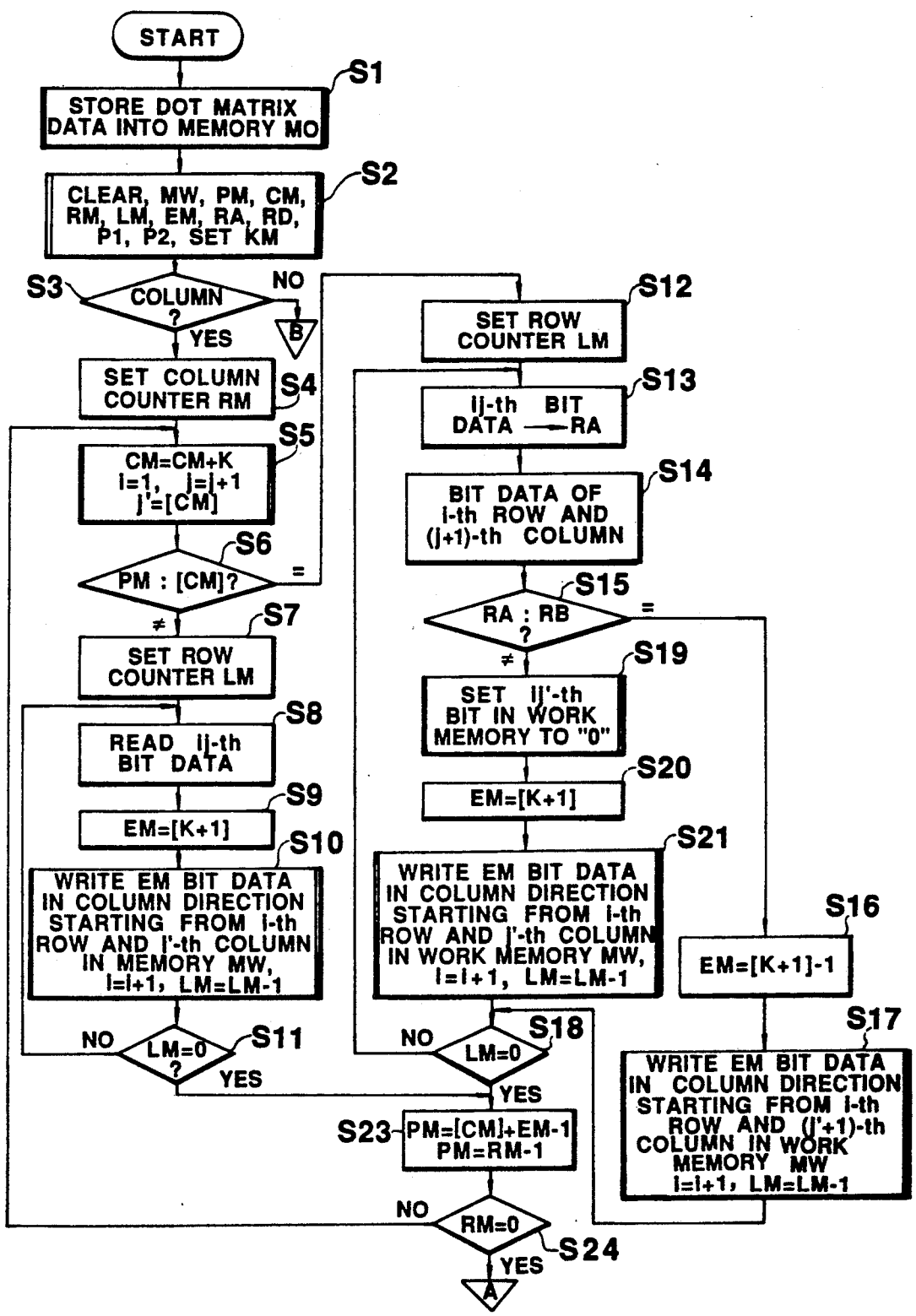
FIGS. 5A and 5B are flowcharts for explaining the operation of a printer shown in FIG. 3.

In step S1 in FIG. 5A, the dot matrix data, which is sent from the host computer 1 or supplied from the CG8, is stored in the original data memory MO in the RAM 6.

In step S2, all the data stored in the work memory MW in the RAM 6 is cleared. Also cleared are the contents of the memories PM and CM, the column counter RM, the row counter LM, the width counter EM, the A to D registers RA-RD, the read position pointer P1, and the write position pointer P2. The magnification K is set to be 4/3 in the magnification memory KM.

In step S3, it is determined whether or not there is data enlargement in the column direction. If there is such data enlargement, the flow advances to step S4; if not, the flow jumps to step S28 to be described later. Since in this embodiment the dot matrix is enlarged in the column direction, the flow proceeds to step S4.

In step S4, the number of columns of the original dot matrix data, "6" in this case, is set in the column counter RM.

In the subsequent step S5, the data held in the memory CM is added to the magnification K stored in the magnification memory KM. The resultant value is saved in the memory CM. As the memory CM is holding a value "0" and the magnification K is 1.3333 . . . in this example, a value "1.3333 . . . is set in the memory CM.

The new value for the memory CM may also be obtained according to the following equation:

$$CM = FA + (CA - FA)K$$

where

FA: start address of the original memory MO in the enlarging direction,

CA: address of a target dot in the original memory MO in the enlarging direction, and K: magnification.

Then, "1" is set as the row value i of the hold value (i, j) of the read position pointer P1, and "1" is added to the column value j. Further, "1" is set to the row value i of the read position pointer P2 and an integer portion of what is set in the memory CM is set as the column value j'. In this example, (1, 1) is set in both pointers P1 and P2.

In step S6, it is discriminated whether or not the values in the memory PM and [CM] coincide with each other (where [ ]: gauss symbol indicating only an integer portion). That is, it is checked whether or not a memory area in the work memory MW where data is already written overlaps with a memory area where data should be written in following processing. In this example, as the memory PM has a value "0" and an integer portion of the value stored in the memory CM has "1", the flow goes to step S7.

The number of rows of the dot matrix data, "6," is set in the row counter LM in step S7.

In step S8, bit data in the i-th row and the j-th column or ij-th bit data (this expression will be used hereinafter), which is specified by the read position pointer P1, is read out. In this example, the data "1" in the first row and the first column in the original data memory MO is read out.

In step S9, "2" which is the magnification K having its decimal portion raised to a unit is set in the width counter EM.

In step S10, the read data is written in the work memory MW in the column direction from the position (i, j') indicated by the pointer P2, by the number of bits specified by the counter EM. In this example, since the pointers P1 and P2 indicate (1, 1) and the counter EM is holding "2," as mentioned above, the data in the first row and first column of the original data, "1," is written in the first row and first and second columns of the work memory MW as shown in the exemplary diagram in FIG. 7A. The value in the row counter LM is then decremented by "1." In order to process the dot data in the next row, "1" is added to the row values i of the pointers P1 and P2. As LM=5 in this example, both pointers P1 and P2 indicate (2, 1).

In step S11, it is discriminated whether or not the hold value of the row counter LM is "0." If the value is "0," the flow proceeds to step S23; if it is not "0", which means that there still remains a row to be processed, the flow returns to step S8. Since LM=5 in the example, the flow returns to step S8 where the bit data in the second row and first column of the original data is read out. Thereafter, the aforementioned sequence of steps is repeated.

After the process described above is repeated six times and the row counter LM holds "0," processing for the data in the first column of the original dot matrix data is terminated. The flow then goes to step S23 where an integer part of the value stored in the memory CM is added to the value held in the width counter EM, and "1" is subtracted from the sum. The resultant value indicates the number of the column at the back end (right end) of the memory area in the work memory MW where data is written. Further, the value in the column counter RM is decremented by "1." In this example, as the memory CM is holding "1" as the integer portion and the width counter EM "2," a value 2" is set in the memory PM because the right end of the memory area in the work memory MW where the data is written is second column. The column counter RM holds "5".

In step S24, it is determined whether or not the value held in the column counter RM is "0." If the value is not "0," there is a column to be processed next, so that the flow returns to step S5. If this value is "0," which means that there is no columns to be processed next, the flow advances to step S25. Since RM=5 in this example, the flow returns to step S5.

In step S5, as mentioned above, the magnification K is added to the value stored in the memory CM. Then, the indicating values of the pointers P1 and P2 are updated. In this example, an integer portion of the hold value of the memory CM is "2," and the hold values of the pointers P1 and P2 are set to the coordinates (1, 2).

The hold value of the memory PM is compared with an integer portion of that of the memory CM in step S6. As the PM=2 and [CM]=2 in this case, the flow goes to step S12.

The number of rows is set in the row counter LM in step S12; LM=6 in this example.

In step S13, the bit data at the position (i, j) pointed by the pointer P1 is read from the original data memory MO, and set in the register RA. The data "0" in the first row and second column of the original memory MO is read out and set in the register RA in this example.

In step S14, the bit data in the same row but the next column of the original data memory, i.e., the bit data at the position (i, j+1), is read out and set in the register RB. In this example, the bit data "1" at the coordinates (1, 3) in the original data memory is read out, then set in the register RB.

Then, it is discriminated in step S15 that the values held in the registers RA and RB are equal to each other. In other words, it is determined whether or not the target dot data is identical to dot data in the same row as the target data but in the next column. If both data are the same, the flow proceeds to step S16; if they differ from each other, the flow goes to step S19. The two pieces of data to be compared in this example are "1" and "0," different from each other, so that the flow advances to step S19.

In step S19, the dot data at the transfer destination where overlapping has occurred is temporarily cleared ("0" is written), as shown in the exemplary diagram in FIG. 7B. That is, the data stored at the position (1, 2) in the work memory MW is cleared.

In step S20, the magnification K with its decimal portion raised to a unit is set in the width counter EM. In this example, the width counter EM holds "2" which is obtained by raising the magnification "1.3333" to a unit.

In step S21, the data stored in the register RA is written in the work memory MW, starting from the position indicated by the pointer P2, by the number of bits held in the width counter EM. As exemplarily shown in FIG. 7C, data "0" is written in the first row and second and third columns of the work memory MW in this example. This completes transfer of data for one row with respect to the j-th column of the original data memory MO, so that the content of the row counter LM is decremented by "1." Further, "1" is added to the row values i indicated by the pointers P1 and P2. In this example, LM=5, P1=P2=(2, 2).

Figure 6A:
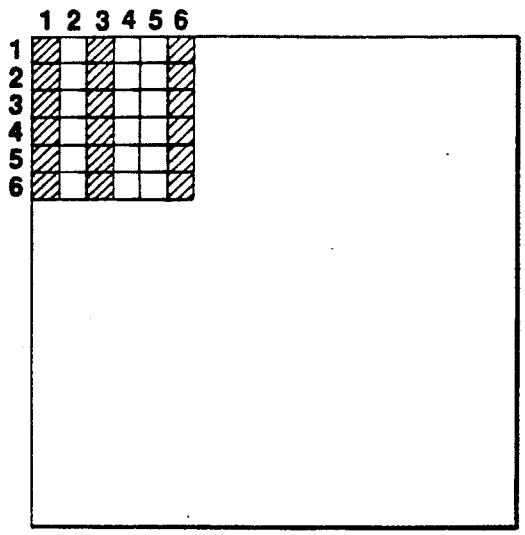
FIG. 6A is a diagram exemplifying dot matrix data to be enlarged.

In step S18, it is determined whether or not the value of the row counter LM is "0." If it is "0," which means that the process for the column is completed, the flow goes to step S23. If counter value is not "0," there is a column to be processed next, so that the flow returns to step S13. As the data in the second to sixth rows should be processed in this example, the flow returns to step S13. Since the image patterns in all the rows shown in FIG. 6A are the same, a sequence of steps S13 to S18 is repeated six times to terminate the process for the dot matrix data in the second column of the original data memory MO. The flow then advances to step S23.

The values of the pointers P1 and P2, and the column counter RM are updated in step S23. The flow then returns through step S24 to step S5, starting a process for the data in the third column of the original data memory MO.

Upon starting the data process for the third column of the original data memory MO, a value "3.999..." is set in the memory PM in step S5. Since the memory PM is holding "3" (the column number at the right end of the written position shown in FIG. 7C), it is determined in step S6 that overlapping has occurred. The image pattern illustrated in FIG. 6A has different dot matrix data in the third and the fourth column. The flow, therefore, takes the route of steps S5, S6, S12, S15, S19, S21, S18 and S23 as per the aforementioned process for the second column of the original data memory. As a result, the dot data in the third column of the work memory MW is cleared as exemplified in FIG. 7D, then data "1" is written in the third and fourth columns of the work memory MW as shown in FIG. 7E.

When the flow goes to processing the data in the fourth column of the original memory MO, "5.333" is set in the memory CM in step S5. As the data in the memory PM is "4" (the column number at the right end of the write position shown in FIG. 7E), it is determined in step S6 that no data overlapping has occurred because [5.333]=5≠4 in this example. The flow, therefore, takes a route of steps S7, S11, S23 and S24, and data "0" is written in the fifth and sixth column of the work memory MW as shown in FIG. 7F.

The flow then goes to processing the data in the fifth column of the original data memory MO.

In step S5, "6.666..." is set in the memory CM. As the memory PM is holding data "6" (see the FIG. 7E), the flow advances to step S15, going through steps S6, S12, S13 and S14. As should be apparent from FIG. 6A, the original dot matrix data has different data in the fifth and sixth columns. Accordingly, the flow takes a route of steps S19, S21, S18, S23 and S24. Consequently, the data in the sixth column of the work memory MW is cleared as shown in FIG. 7G, then data "0" is written in the sixth and seventh columns of the work memory MW, as shown in FIG. 7H.

The flow then returns to step S5 to process the data in the sixth column of the original dot matrix data. A value "7.999..." is set in the memory CM in step S5, and the memory PM is holding data "7" (see FIG. 7H). The flow therefore advances to step S15, going through steps S6, S12, S13 and S14. As should be apparent from FIG. 6A, there is no data in the seventh column of the original dot matrix data. Consequently, a non-coincidence is detected in step S15, and the flow takes a route of steps S19, S21 and S18. The data in the seventh column of the work memory MW is cleared as illustrated in FIG. 7I, and data "1" is written in the seventh and eighth columns of the work memory MW as shown in FIG. 7J.

Figure 6B:
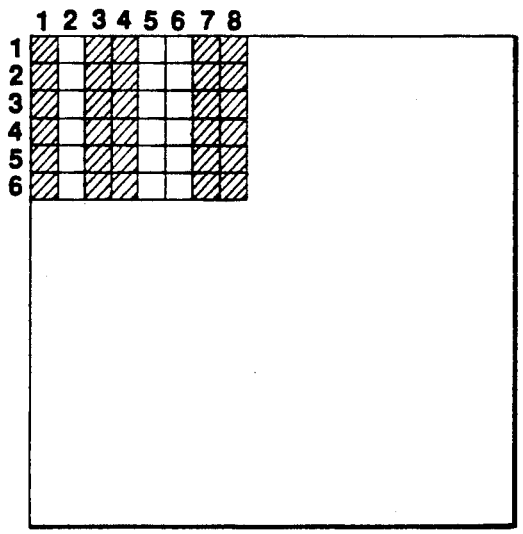
FIG. 6B is a diagram illustrating enlargement of dot matrix data shown in FIG. 6A in a column direction.

Through the above operation, dot matrix data enlarged 4/3 times across the column as shown in FIG. 6B is completed.

The flow then proceeds to step S23 for updating the value in the memory PM. Further, the value in the column counter RM is decremented by "1" and becomes "0". The flow naturally goes to step S25 from step S24.

It is not happen in the above mentioned example, if, on the other hand, it is discriminated in step S15 that there is a coincidence between the target data in the original dot matrix data and data which exists in the same row as the target data and is in the next column to be processed, the flow advances to step S16.

In step S16, the width counter EM the magnification K with its decimal portion raised to a unit minus "1" is set in the width counter EM. In the aforementioned case where the dot matrix data is enlarged 4/3 times in the column direction, the value in the counter EM becomes "1."

Given that the bit position of the data transfer destination indicated by the pointer P2 is the i-th row and the j'-th column, "1" is added to the number of columns. The original data is written in the column direction by EM bits starting from the i-th row and (j'+1)-th column of the work memory MW. As a result, data is written in that memory area in the work memory which is other than those where data is already stored. This completes data transfer for one row with respect to the j-th column, so that the value of the row counter LM is decremented by "1." Further, "1" is added to the row values i indicated by the pointers P1 and P2 to advance to processing for the next row. The value of the width counter EM is decremented by "1" in step S16, because the overlapped portion is present in the column direction and is one dot in this embodiment. The flow then proceeds to the above-described step S18.

The step of enlarging dot matrix data in the row direction will be described below.

In step S25, dot matrix data stored in the original data memory MO of the RAM 6 is cleared. Further, dot matrix data stored in the work memory MW is transferred to the original data memory MO. This data transfer can permit data enlargement in both row and column directions using a single work memory MO.

In step S26, the data stored in the work memory MW is cleared. Also cleared are the contents of the memories PM and CM, the column counter RM, the row counter LM, the width counter EM, the C and D registers RC and RD, the read position pointer P1, and the write position pointer P2. The magnification K=4/3 is set in the magnification memory KM.

In step S27, it is determined whether or not there is data enlargement in the row direction. If there is such data enlargement, the flow advances to step S28; if not, the processing is terminated. Since in this example the dot matrix is enlarged in the row direction, the flow proceeds to step S28.

The number of rows of dot matrix data stored in the original data memory MO is set in the row counter LM in step S28. In this example, LM=6. Further, the magnification K is added to the data held in the memory CM. As the initial value of the memory CM is "0" and the magnification K is 1.3333 in this example, a value "1" is set in the memory CM. Further, "1" is set as the column value j of the hold value (i, j) of the read position pointer P1, and "1" is added to the row value i. Further, "1" is set as the column value j of the write position pointer P2 and an integer portion of the value set in the memory CM is set as the row value i'. In this example, (1, 1) is set in both pointers P1 and P2.

In step S30, it is discriminated whether or not the value held in the memory PM and the integer portion of the value stored in the memory CM coincide with each other. That is, it is checked whether or not a memory area in the work memory MW where data is already written overlaps with a memory area where data should be written in the present processing, as in step S6. In this example, as the memory PM has a value "0" and an integer portion of the data in the memory CM is "1", the flow goes to step S31.

The number of columns of the dot matrix data stored in the original data memory MO is set in the column counter RM in step S31. In this example, RM=8.

In the subsequent step S32, data is read out from the ij-th position which is specified by the read position pointer P1. In this example, the data "1" in the first row and the first column in the original data memory MO is read out.

In step S33, the magnification K having its decimal portion raised to a unit is set in the width counter EM; EM=2 in this example.

In step S34, the read data is written in the work memory MW in the column direction starting from the position (i', j) indicated by the pointer P2, by the number of bits specified by the counter EM. In this example, since P1=P2=(1, 1) and EM=2, data "1" is written in the first and second rows in the first column of the work memory MW as exemplarily shown in FIG. 8A. The value in the column counter RM is then decremented by "1." In order to process the dot data in the next column, "1" is added to the column values j of the pointers P1 and P2.

In the subsequent step S35, it is discriminated whether or not the hold value of the column counter RM is "0." If the value is not "0," which means that there still remains a column to be processed, the flow returns to step S32 and the above processing is repeated. Since RM=7 in the example, the flow returns to step S32 and the aforementioned sequence of steps is repeated.

After the process described above is repeated eight times and the column counter RM holds "0," processing for the data in the first row of the original dot matrix data is terminated. The flow then advances from step S35 to step S46 where an integral part of a value stored in the memory CM is added to the value held in the width counter EM minus 1. The resultant value is stored in the memory PM and indicates the number of the rows at the back end (lower end) of the memory area in the work memory MW where data is written. Further, the value in the row counter LM is decremented by "1." In a specific example, since [CM]="1" and EM="2," PM=2 and LM=5.

In step S47, it is determined whether or not the value held in the row counter LM is "0." If the value is not "0," there is a row to be processed next, so that the flow returns to step S29. If this value is "0," which means that there is no column to be processed next, the processing is terminated. Since LM=5 in this example, the flow returns to step S29.

In step S29, as mentioned above, the value stored in the memory CM and those indicated by the pointers P1 and P2 are updated. In this example, the hold value of the memory CM is set to "2.66...," and the hold values of the pointers P1 and P2 to the coordinates (2, 1).

The hold value of the memory PM is compared with an integer portion of that of the memory CM in step S30. Since PM=[CM]=2 in this case, the flow goes to step S36.

The number of columns, "8," is set in the column counter RM in step S36.

In step S37, the bit data at the position (i, j) pointed by the pointer P1 is read out from the original data memory MO, and set in the register RC. The data "1" in the second row and first column of the original memory MO is read out and set in the register RC in this example.

In step S38, the bit data in the same column as the target data but the next row, i.e., the data at the position (i+1, j), is read out and set in the register RD. In this example, the bit data "1" at the coordinates (3, 1) is read out, then set in the register RD.

Then, it is discriminated in step S39 whether or not the values held in the registers RC and RD are equal to each other. In other words, it is determined whether or not the color of the target dot equals that of the dot in the same column as the target dot but in the next row. If both are the same, the flow advances to step S40; if they differ from each other, the flow goes to step S42. The two pieces of data to be compared in this example are "1" and "1," obviously equal to each other, so that the flow advances to step S40.

In this step S40, the value in the width counter EM is decremented by "1"; EM="1" in this example.

In the next step S41, "1" is added to the row number i' indicated by the pointer P2, then data set in the register RC is written in the work memory MW by EM bits starting from the (i'+1)-th row and j-th column indicated by the pointer P2. As a result, data is written in that memory area in the work memory MW which is other than those where data is already stored. In this example, data "1" is written in the third row and the first column of the work memory MW while keeping the data in the second row and the first column saved there, as shown in FIG. 8B.

As data transfer for one column with respect to the i'-th row is completed, the value of the column counter RM is decremented by "1." Further, "1" is added to the column values j indicated by the pointers P1 and P2 for transition to processing for the next column. The value of the width counter EM is decremented by "1" in step S40, because the overlapped portion is present in the row direction and is one dot in this embodiment. The flow then proceeds to the above-described step S45.

In step S45, it is discriminated whether or not the value in the column counter RM is "0." In this embodiment, RM=7 and the flow returns to step S37. The dot matrix data shown in FIG. 6B has the same color in the row direction. Accordingly, the sequence of steps S37, S39, S40, S41 and S45 is repeated eight times. When RM=0, the flow advances from step S45 to step S46 where the sum of an integral part of the values held in the memory CM and the width counter EM minus 1 is set in the memory PM, and the value of the row counter LM is decremented by "1."

In step S47, it is discriminated whether or not the value in the row counter LM is "0." If this value is "0," the processing is terminated. If it is not "0," on the other hand, the flow returns to step S29 to continue the processing. Since LM=4 in this example, the flow returns to step S29 to continue the aforementioned processing in order to process the data in the third row of the original data.

Assume that the processing proceeds and the pointer P1 indicates the data in the sixth row and first column of the original dot matrix data. In this case, the number of rows at the end of the work memory MW is "7," so is the number of rows at the start of the write position. Thus, PM=[CM]=7, and the flow advances from step S30 to step S36 where data "1" in the sixth row and first column of the original dot matrix data is set in the register RC. As should be apparent from FIG. 6B the original dot matrix data does not have data in the seventh row, so that "0" is set in the register RD in step S37. As a result, it is determined in step S39 that the compared data differs from each other, and the flow advances to step S42.

In this step S42, the data at the i'j-th position in the work memory MW pointed by the pointer P2 is cleared.

The magnification K with its decimal portion raised to a unit is set in the width counter EM in step S43. In the next step, data stored in the register RC is written in the work memory MW in the row direction by the number of bits indicated by the value set in the counter EM, starting from the i'-th row and j-th column. Then, the column values j indicated by the pointers P1 and P2 are incremented by "1" and the value in the column counter RM is decremented by "1." More specifically, data in the seventh row and first column in the work memory MW is canceled, as exemplified in FIG. 8C. Then, data "1" read out from the sixth row and first column in the original data memory MO is written in the seventh and eighth rows and first column in the work memory MW, as shown in FIG. 8D.

The flow then advances to the aforementioned step S45 to continue the processing for the remaining columns.

Figure 6C:
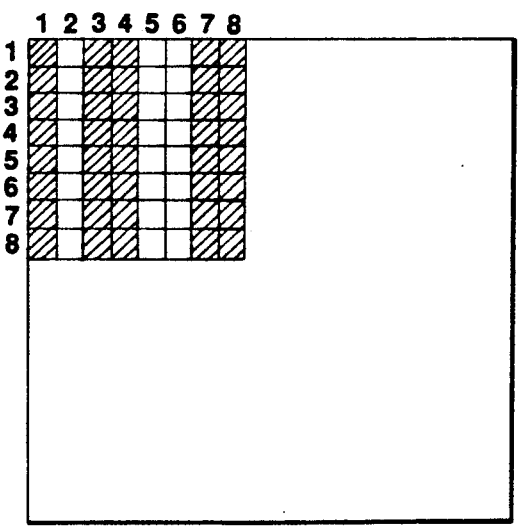
FIG. 6C is a diagram illustrating enlargement of dot matrix data shown in FIG. 6B in a row direction.

Finally, the processing is terminated when it is determined in step S47 that the value in the row counter LM is "0," completing the dot matrix data shown in FIG. 6C in the work memory MW.

In this embodiment, in enlarging dot data, (1) it is discriminated whether or not data write positions overlap the position of data which has already been produced, (2) data is written as it is when no overlapping has occurred, and (3) it is discriminated whether or not adjoining dot data are of the same color when overlapping has occurred. If the data are of the same color, the data of the same color will be written at the next writing time, so that read-out data is written at positions except the overlapped portion. In other words, data already written at the overlapped position is given a priority. On the other hand, if the dots are of different colors, in order to protect data presently read out, the overlapped portion is temporarily cleared and the read-out data is written at positions including the overlapped portion. With the use of this technique, assuming that presently-read data is white data and data at the overlapped portion is of black, white data is written at the overlapped portion when adjoining data is black data, thus preventing white data from being smeared with black data. It is therefore possible to acquire enlarged dot matrix data which has a good contrast and has a relatively high fidelity to original data.

According to this embodiment, as described above, in a case of enlarging dot matrix data, it is possible to prevent:

(1) white data from being smeared with black data, and vice versa, and (2) the magnification of the dots of part of the original data from becoming greater.

Figure 5B:
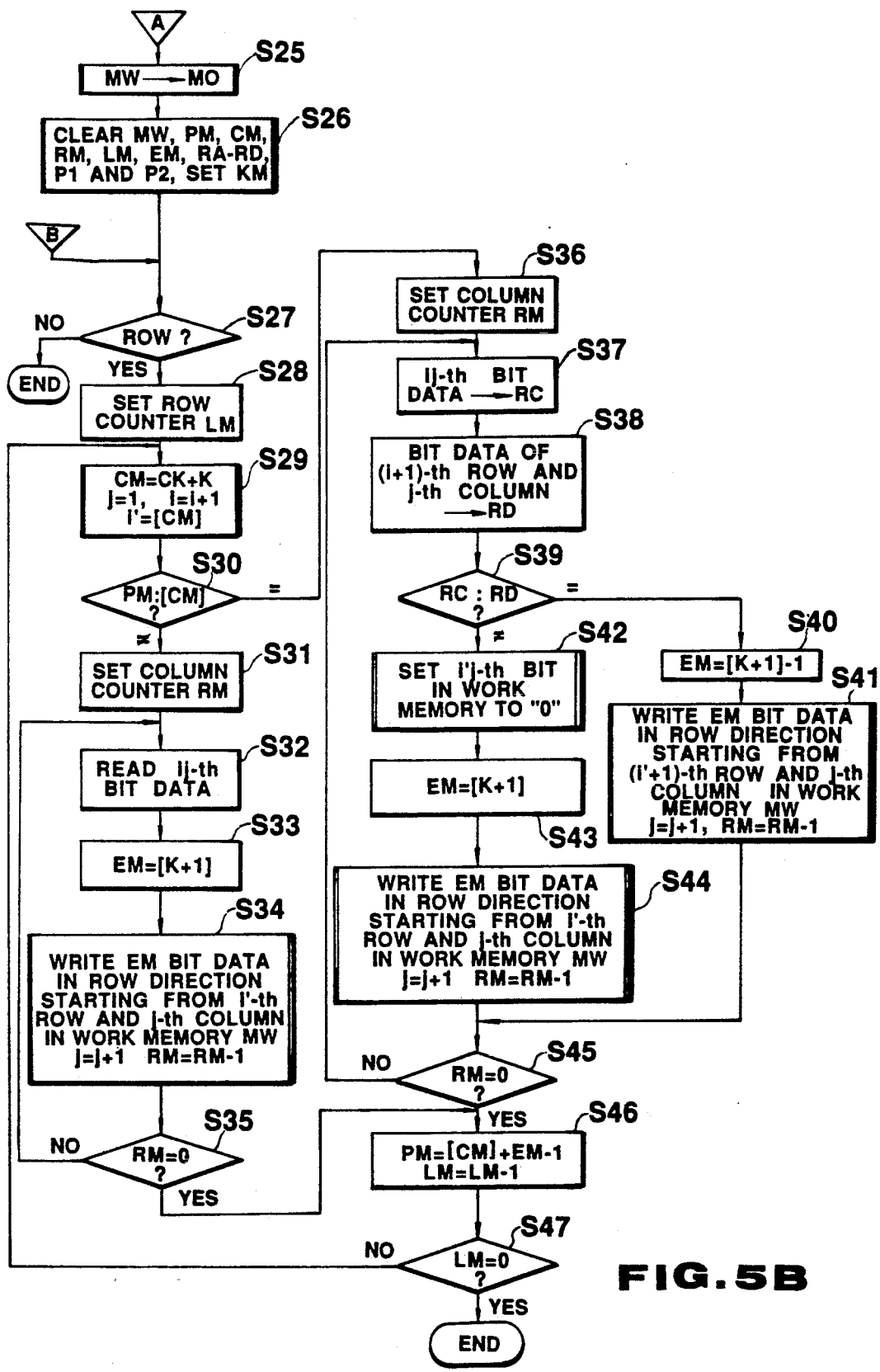

The present invention is not restricted to the above particular embodiment. For instance, the operation illustrated in FIGS. 5A and 5B is also effective in enlarging dot matrix data only in the row direction or column direction. In addition, the magnification K may take other values than 4/3.

Although, in the above embodiment, the data stored in the work memory MW is transferred in the original data memory MO in step S25, the data held in the work memory MW may be used as original data without executing any data transfer to form an enlarged image in the original data memory MO.

Although this embodiment uses four registers, two registers may serve the same purpose when they are shared in steps S13 and S14, and also in steps S37 and S38.

If writing data in steps S20 and S43 can substantially clears the original data, steps S19 and S42 for clearing dot data become unnecessary.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus of enlarging dot matrix data, comprising:
    original memory means for storing dot matrix data to be enlarged;
    work memory means for storing dot matrix data in an enlargement process;
    magnification designating means for specifying a magnification;
    read means for reading data from said original memory means dot by dot;
    position indicating means for specifying write positions to write data read out from said original memory means into said work memory means in response to said magnification specified by said magnification designating means; and
    write means for writing data read out by said read means in said work memory means at said positions specified by said position designating means;
    said position designating means including,
        computation means, in response to said magnification, for computing positions in said work memory means into which the data read by said read means are to be written,
        discrimination means for discriminating whether or not said positions computed by said computation means overlap a position in said work memory means where data is already written,
        means for making said positions computed by said computation means as an output of said position designating means when said discrimination means discriminates that no overlapping has occurred,
        comparing means for comparing said data read out by said read means with data adjoining said read-out data in an enlarging direction in said original memory means and to be read out later when said discrimination means discriminates that overlapping has occurred,
        means for clearing data stored in said work memory means at said positions computed by said computation means and making said computed positions as an output of said position designating means, when said comparing means determines that said compared data differ from each other, and
        means for making at least one of said positions computed by said computation means which is other than those positions in said work memory means where data is already written as an output of said position designating means, when said comparing means determines that said compared data coincide with each other.

2. The apparatus according to claim 1, wherein said computation means comprises:
    start position computing means for indicating a start address of a write position; and
    dot quantity computing means for computing the number of dots by which data read out by said read means is to be written.

3. The apparatus according to claim 2, wherein an address value CM in said enlarging direction, computed by said start position computing means is given by:

$$CM = [FA + (CA - FA)K]$$

where
    FA: start address of said original memory means,
    CA: address of a target dot in said original memory means in said enlarging direction,
    K: magnification, and
    [ ]: gauss symbol indicating only an integer portion.

4. The apparatus according to claim 2, wherein the number of dots computed by said dot quantity computing means is said magnification whose decimal portion is raised to a unit.

5. The apparatus according to claim 1, further comprising enlargement executing means for executing an enlarging process for one of a column and a row after an enlarging process for the other is completed, in order to enlarge data stored in said original memory means.

6. The apparatus according to claim 5, wherein said enlargement executing means includes:
    transfer means for, after forming an image enlarged in one of a row direction and a column direction in said work memory means, transferring said formed image to said original memory means; and
    means for permitting said apparatus to execute an enlarging process in the other direction using said transferred data as original dot matrix data.

7. The apparatus according to claim 5, wherein said enlargement executing means includes means for, after forming an image enlarged in one of a row direction and a column direction in said work memory means, using said work memory means to store original data and forming dot matrix data enlarged in the other direction in said original memory means.

8. The apparatus according to claim 1, wherein said original dot matrix data is loaded from an external unit.

9. The apparatus according to claim 1, further comprising a generator for externally receiving character code data and generating dot data corresponding thereto, said original dot matrix data being generated by said generator.

10. The apparatus according to claim 1, wherein said discrimination means includes end address memory means for storing an address of an end region in said work memory means where data is written, and discriminates whether or not data overlapping occurs by comparing an address of a position computed by said computation means with said address stored in said end address memory means.

11. A method of enlarging dot matrix data, comprising:
a read step of reading original dot matrix data dot by dot;
a computation step of computing write position to write said dot matrix data read out in said read step, in response to a magnification;
a discrimination step of discriminating whether or not said positions computed in said computation step overlap a position where data is already written;
a step of writing said data read out in said read step at said positions computed in said computation step when said discrimination step shows that no overlapping has occurred;
a comparison step for comparing said data read out in said read step with data adjoining said read-out data in an enlarging direction in the original dot matrix data and to be read out later when said discrimination step shows that overlapping has occurred;
a step of clearing data stored at said positions compared in said computation step and writing said data read out in said read step at said computed positions, when said comparison step shows that said compared data differ from each other; and
a step of writing said data read out in said read step at those of said positions computed in said computation step which are other than those discriminated in said discrimination step to overlap each other, when said comparison step shows that said compared data coincide with each other.

12. The method according to claim 11, wherein said computation step comprises:
a start position computing step for computing a start address of a write position; and
a dot quantity computing step for computing the number of dots by which data read out in said read step is to be written.

13. The method according to claim 12, wherein an address value CM of said write position in said enlarging direction is acquired by the following formula:

$$CM 32 [FA+(CA-FA)K]$$

where

FA: start address of original dot matrix data,
CA: address of a present target dot in said dot matrix data undergoing a enlarging process in said enlarging direction,
K: magnification, and
[ ]: gauss symbol indicating only an integer portion.

14. The method according to claim 12, wherein the number of dots computed in said dot quantity computing step is said magnification whose decimal portion is raised to a unit.

15. The method according to claim 11, wherein after an image enlarged in one of a row direction and a column direction is produced, dot matrix data enlarged in the other direction is produced.

16. The method according to claim 11, wherein said discrimination step includes a step of storing an address of an end of dot matrix data undergoing a production process, and discriminates whether or not data overlapping occurs by comparing an address of a position computed in said computation step with said address of said end.

17. An apparatus comprising:
original memory means for storing dot matrix data to be enlarged;
work memory means for storing said dot matrix data in an enlargement process;
magnification designating means for specifying a magnification;
read means for reading data from said original memory means; and
write means for determining write positions to write data into said work memory means in response to said magnification and writing said data read out by said read means into said work memory means;
said write means including means for discriminating whether or not data write positions overlap a position where data is already written, discriminating whether or not a color indicated by said read-out data is the same as a color indicated by predetermined dot data stored adjacent to said read-out data in said original memory means if overlapping occurs, and writing data in said data write positions, except for those where data is already written, to retain said color at the overlapped portion if said colors are the same.

18. The apparatus according to claim 17, wherein said write means writes said read-out data at those of said write positions excluding an overlapped portion when said overlapping is present and said colors are the same, and writes said read-out data at said write positions when said overlapping is present and said colors differ from each other.

19. The apparatus according to claim 17, wherein when determining that said write positions do not overlap said position where data is stored, said write means write said data, read out by said read means, at said write positions.

20. The apparatus according to claim 17, wherein said write means includes end address memory means for storing an address of an end of a memory region in said work memory means where data is written, and means for acquiring a write position, and discriminates whether or not data overlapping occurs by comparing an address of said acquired write position with said address stored in said end address memory means.

* * * * *